Patented Mar. 12, 1946

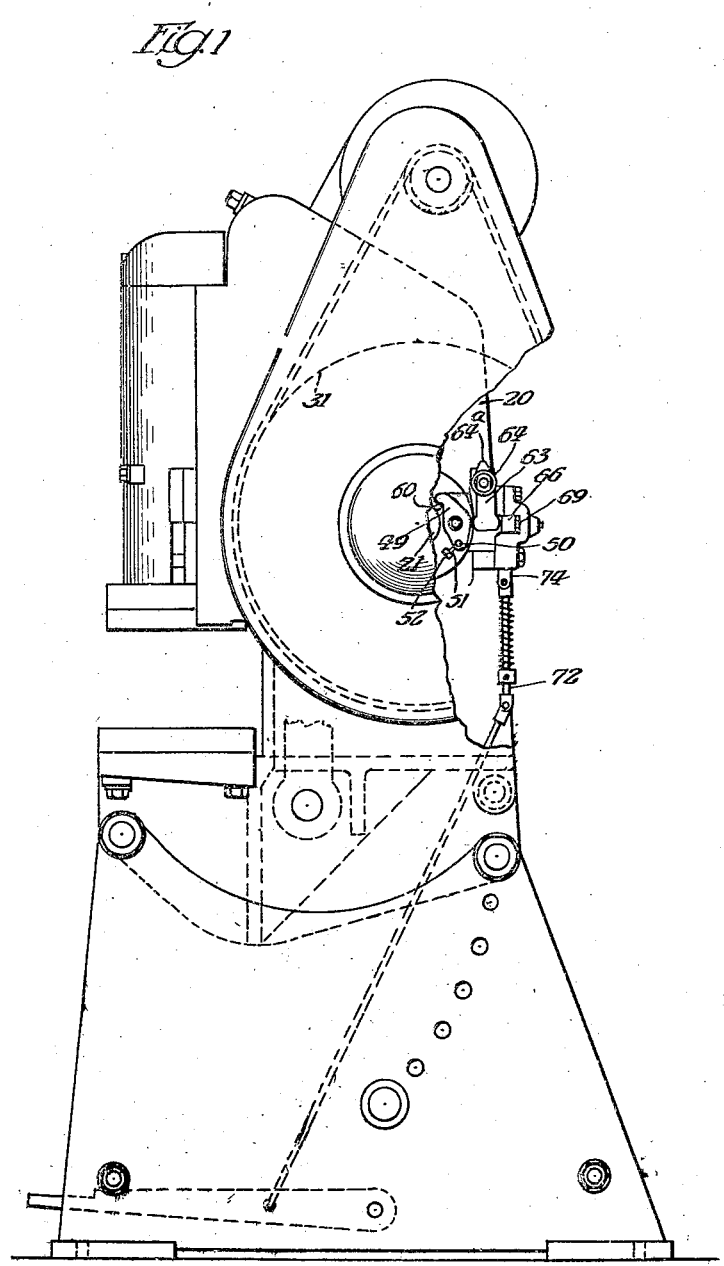

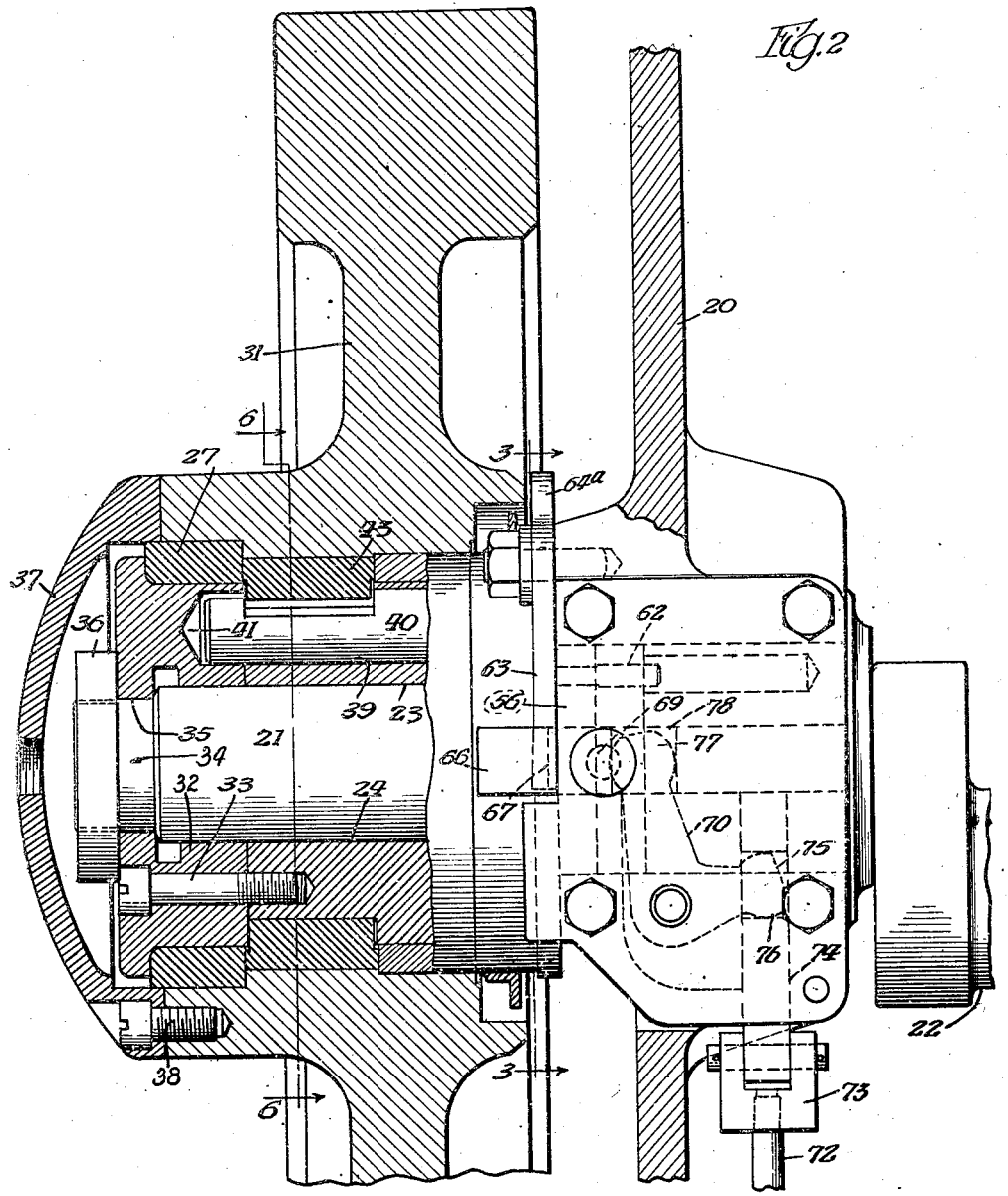

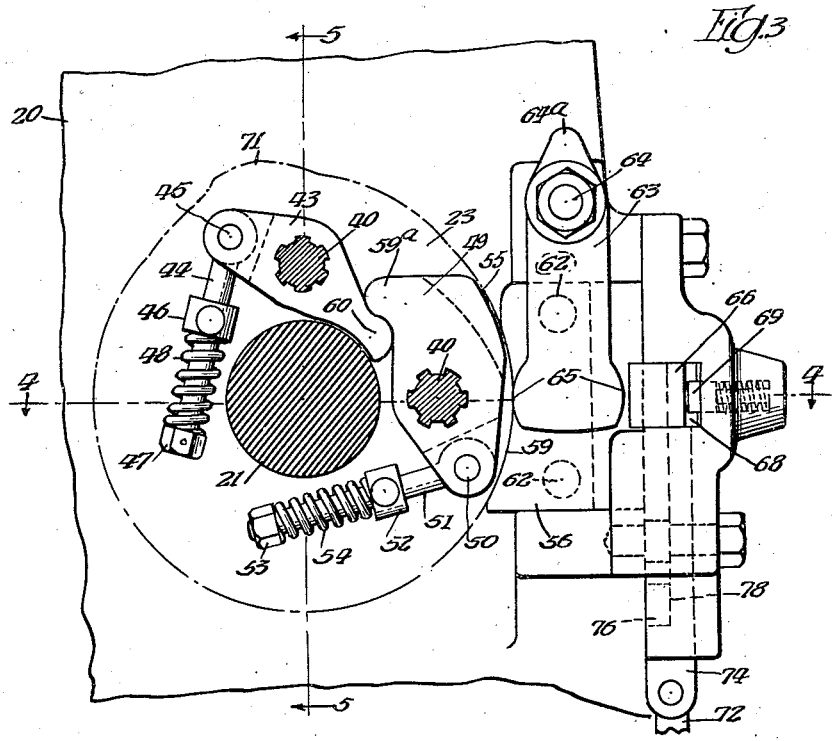
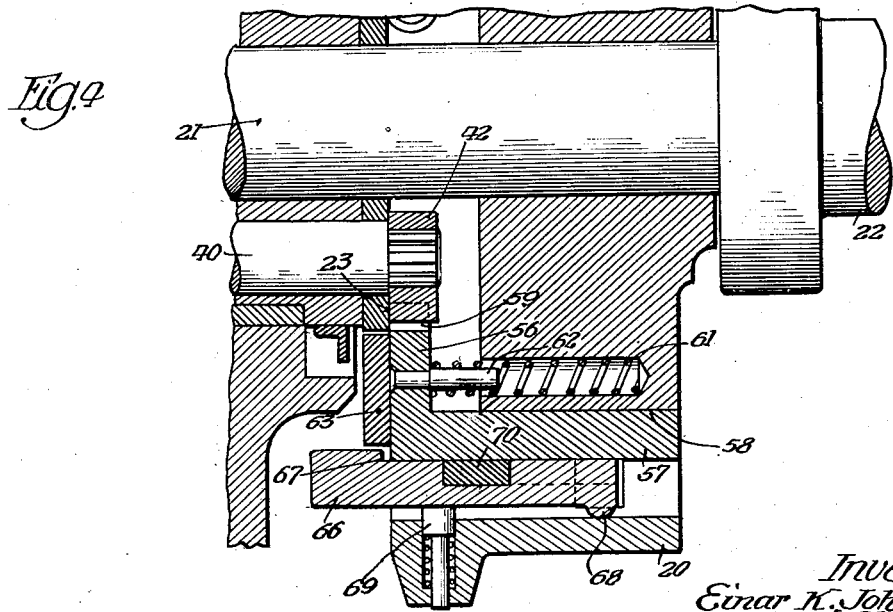

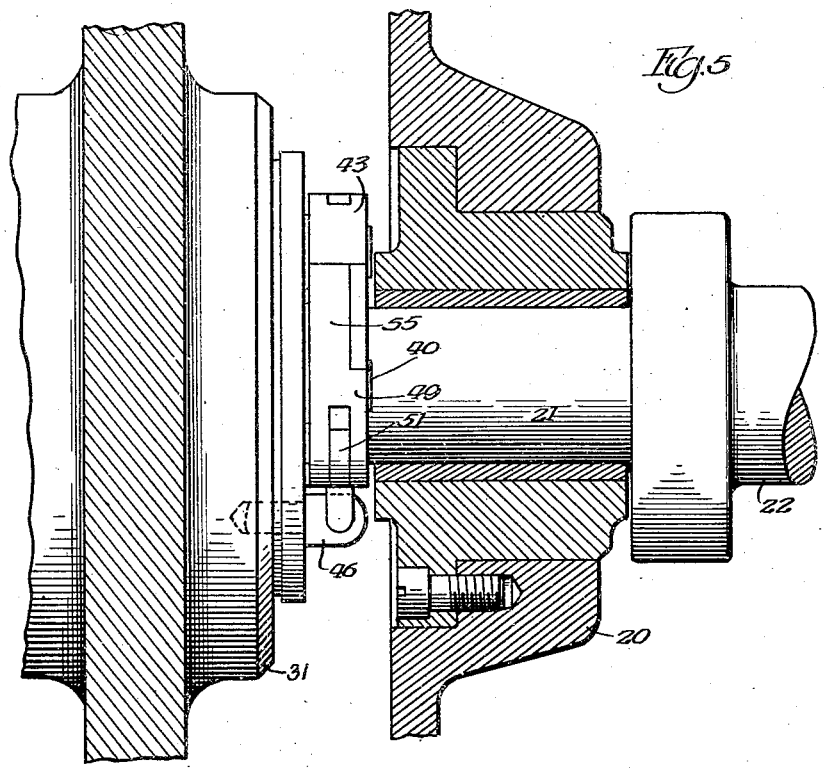
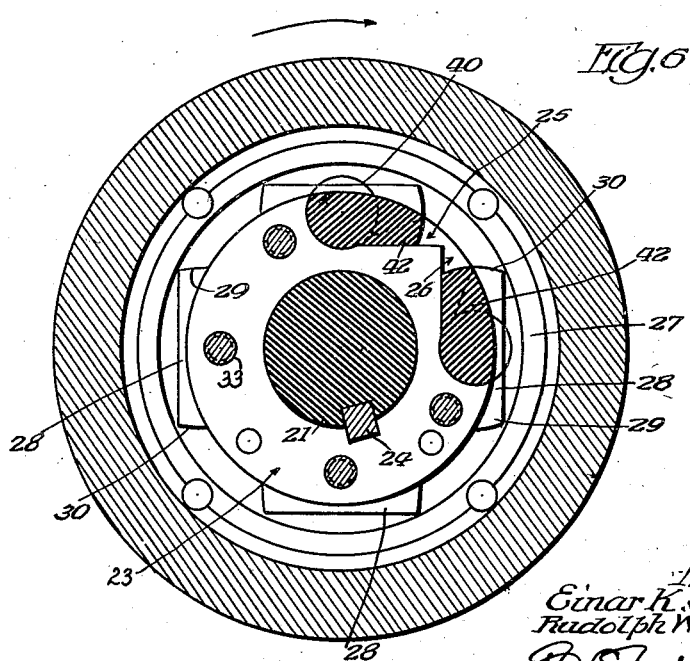

2,396,427

UNITED STATES PATENT OFFICE 2,396,427

CLUTCH MECHANISM

Einar K. Johansen, Oak Park, and Rudolph W. Glasner, Chicago, Ill., assignors to Clearing Machine Corporation, Chicago, Ill., a corporation of Illinois Application February 2, 1944, Serial No. 520,756

17 Claims. (Cl. 192—29)

This invention relates to improvements in clutch mechanism, the general object of which is to provide an improved device of this character, which will be of simple construction and reliable in its operation under all conditions.

A further object is to provide an improved clutch in which the driving and driven elements are concentrically arranged, one of the elements being continuously driven, and improved means for rendering said elements active and inactive with respect to each other, through the medium of locking means disposed therebetween, thereby obviating the necessity of laterally shifting one of the elements with respect to the other, thus reducing the effort or power necessary to shift the element, and improved means for controlling, at will, the interlocking and releasing mechanism.

A further object is to provide improved means for automatically controlling the locking mechanism, whereby, after there has been imparted to the driven element a predetermined degree of rotation, the locking mechanism will be rendered inactive so that the motion of the driven element will be arrested while the driving element continues to rotate.

A still further object is to provide improved means for preventing "kick back," or retrograde movement, of the driven element under the stress or load exerted by the work upon the driven element.

To the attainment of these ends and the accomplishment of other new and useful objects as will appear, the invention consists in the features of novelty in substantially the construction, combination and arrangement of the several parts, hereinafter more fully described and claimed and illustrated in the accompanying drawings, in which Fig. 1 is a side elevation of a press, partly in elevation, partly broken away, with parts omitted, having a clutch mechanism constructed in accordance with the principles of this invention applied thereto.

Fig. 2 is an enlarged detail sectional view of the clutch mechanism.

Figure 3 is a detail sectional view taken on line 3—3, Figure 2.

Figure 4 is a detail sectional view taken on line 4—4, Figure 3.

Figure 5 is a sectional view with parts in elevation, and as taken on line 5—5, Figure 3.

Figure 6 is a sectional view as taken on line 6—6, Figure 2.

Referring more particularly to the drawings, the numeral 20 designates a supporting structure or frame in which one end 21 of a crankshaft 22 is journaled. Surrounding the end 21 of the shaft is a clutch member 23 which is fixed to the shaft 21 for rotation therewith, preferably by means of a key 24, and the periphery of the clutch member 23 is cut away to form recesses 25—26. Concentrically arranged with the clutch member 23 is a clutch driving member 27 which is provided with recesses 28 in its inner periphery to form shoulders 29—30 that are opposed to each other. Any number of these recesses 28, and shoulders, may be provided.

This clutch driving member 27 is arranged within a driving member 31, and rotates therewith. The clutch member 23 preferably terminates short of the end of the shaft 21, and an end member 32 is also sleeved upon the shaft, and the end member is secured to the clutch member 23 in any suitable manner, such as by means of fastening members or bolts 33. If desired, the extremity of the shaft 21 may be reduced, as at 34, and the end member 32 may be provided with a reduced opening 35 to abut the shoulder, and a fastening device or nut 36 may be provided on the end of the reduced portion of the shaft.

A cap member 37 may also be provided, which may be secured to the driving member 31 by means of suitable fastening devices 38, so that it may be removed, when desired, to permit access to the parts. The clutch member 23 is also provided with openings 39 which communicate with the respective recesses 25—26. Journaled in these openings 39 are shafts 40, one extremity of each of which projects into a recess 41 in the end member 32, so that the shafts may be rocked.

Connected to each of the shafts and disposed within the respective recesses 25—26, is a pawl 42 adapted to enter the respective recesses 28 in the driving member 27, the pawls being disposed in opposition to each other, so that when the pawls are moved into an active position, and when the driving member 27 is rotating in the direction of the arrow in Fig. 6, the end of one of the pawls will engage one of the shoulders 30 of one of the recesses 28, but when the driven element, under the stress of the work or the load imposed upon it, has a tendency to "kick back," the end of the other pawl 42 will engage one of the shoulders 29 of one of the recesses 28, and thereby lock the driven element against retrograde movement.

Secured to the end of one of the shafts 40 is an arm 43, to one end of which a member 44 is pivotally connected, as at 45. This member 44 passes through an oscillatable bearing 46 and has secured to it, at its free end, a nut or collar 47. Encompassing the member 44 between the collar 47 and the bearing 46, is a spring 48 which tends normally to rock the shaft 40, to position the pawl 42 that is connected thereto so that it will enter one of the recesses 28 when the latter is in a position to receive the pawl.

Connected to the other of the shafts 40 is another arm 49 which also has pivotally connected to it, as at 50, a member 51 that passes through an oscillatable bearing 52. Secured to the end of the member 51 is a nut or collar 53, and a spring 54 encompasses the member 51 and engages the collar 53 and bearing 52. The stress of the spring 54 is such that it tends normally to rock the corresponding shaft 40 in a direction to move the pawl 42 that is connected thereto into a position to enter another of the recesses 28 when the latter is in a position to receive the pawl. These springs 48 and 54 tend normally to cause the pawls 42 to become active, according to the direction of rotation of the driving member, and thereby lock the driving and driven members for rotation together.

The arm 49 is of such a shape that when the pawl to which it is connected is in an active position, a portion 55 thereof will be in a position to be engaged by a control member 56. This control member is preferably in the form of a slide, the body portion 57 of which slide is mounted to move in an opening 58 of the supporting structure 20. The control member 56 is preferably provided with a curved surface 59 that is adapted to assume a position to be engaged by the surface 55 of the arm 49, so that as the surface 55 moves over the surface 59, the arm 49 will be rocked to move the pawl that is connected thereto into an inoperative position against the stress of the spring 54. This arm 49 is provided with a portion 59a that overlaps a portion 60 of the the arm 43, so that as the arm 49 is rocked by the control member 56, the arm 43 will also be rocked so as to render the pawl which is connected thereto, inactive. This operation of the pawls 42 will unlock the driven and driving members, so that the rotation of the driven member will be arrested, but the driving member may continue to rotate.

The control member 56—57 is influenced by a spring 61 housed within the supporting structure 20, and encompasses a pin or projection 62 on the control member. The action of the spring 61 tends normally to move the control member into an active position, so as to move the pawls 42 into an inactive position against the stress of their respective springs 48—54. A member 63 is mounted to freely swing or to be shifted about a pivotal support 64, in a plane transverse to the plane of movement of the control member 56. This member 63 is provided with enlarged portions or cam surfaces 65, for a purpose to be hereinafter described.

Slidable in the opening 58 is a catch 66 having a shoulder 67, and this catch is of a size considerably less than the space in which it moves, and is provided with a rounded portion 68 that forms a fulcrum for the catch when it is moved laterally. A spring pressed member 69 engages the catch beyond its fulcrum, and tends normally to move the catch in a direction that when the catch is moved longitudinally in one direction by means of an actuating member 70, preferably in the form of a bell-crank lever, the shoulder 67 will engage the control member 56 and move it against the stress of the spring 61 into a position where the portion 59 thereof will be moved out of the path of movement of the surface 55 of the arm 49, so that the pawls 42 will remain in an active position to lock the driving and driven clutch members for rotation together. When, however, the bell-crank lever 70 is moved in the opposite direction, the shoulder 67 of the catch 66 will release the control member so that the sprng 61 will move it back into a position so as to release the pawls 42.

In order to automatically unlock the driving and driven clutch members after the driven member has made one complete cycle of rotation, and then arrest the movement of the latter, there may be provided a cam surface 71 on one of the clutch elements, which, when the control member 56 is retracted by the catch 66, will engage one of the cam surfaces 65 on the shiftable member 63 to move the latter about its pivot 64, and cause the other cam surface or enlargement 65 to engage the catch 66 and move it laterally to rock the catch about its fulcrum 68, and thereby move the shoulder 67 out of engagement with the control member 56, so that the latter will be moved by the spring 61 into a position to again render the pawls 42 inactive, and thereby unlock the driving and driven elements with respect to each other.

The parts will then remain in this position with respect to each other until the actuating device for the bell-crank lever 70 is operated. This actuating device may be in the form of a treadle (not shown), which is connected, by means of a rod 72 through the medium of a coupling member 73, with a slide 74 having an an opening 75 therein, into which one end 76 of the bell-crank lever 70 projects, the other end 77 of the bell-crank lever projecting into an opening or slot 78 in the catch 66. If desired, and in order to swing the shiftable member 63 about its pivot 64 by hand, and out of the way, to render the same inactive for continuous operation of the clutch, the extremity of the member 63 may be shaped to form a hand-engaging portion 64a.

It is thought that the operation of this mechanism will be clearly understood from the foregoing, but, briefly stated, it is as follows:

The normal tendency of the springs 48—54 is to move the pawls 42 into a position that they will lock the driving and driven members for rotation together, and the catch 66 will be in a position so as to permit the control member 56 to also be in a position that it will engage the surface 55 of the arm 49 to move the pawls 42 into an inactive position against the stress of the springs 48—54. This will cause the driven member to remain idle while the driving member is rotating. By depressing the treadle (not shown), the catch 66 will. through the medium of the bell-crank lever 70, be moved so that the shoulder 67 will engage the slide 57, of which the control member 56 forms a part, out of the path of movement of the surface 55 of the arm 49 and against the stress of the spring 61.

Immediately upon this operation, the springs 48—54 will tend to move the pawls 42 outwardly, or into a position that when one of the recesses 28 in the driving member 27 assumes a position with respect to the pawls, they will enter the recesses, and one of them will lock the driving and driven clutch members for simultaneous rotation, the other pawl serving to lock the driven member against retrograde movement, or rebound.

The cam 71 on one of the clutch members will thereafter engage the swinging or shiftable member 63 to rock the latter about its pivot 64, and thereby cause the surface or portion 65 thereof to engage the catch 66 and rock the latter about its fulcrum 68 against the stress of the spring pressed member 69, to move the shoulder 67 out of engagement with the control member 56, thereby releasing the latter and enabling the spring 61 to move the control member 56 back into a position that the surface 55 of the arm 49 on one of the pawls 42 will engage the surface 59 of the control member, and both of the pawls, through the medium of the inter-engaging arms 49—43, will be rocked into an inoperative position, or back into the respective recesses 25—26 to unlock the driving and driven clutch elements.

When the treadle is then released, the bell-crank lever 70 will move the catch 66 back into its normal position so that, upon the next operation of the treadle, the bell-crank lever 70 will cause the catch 66 to be again moved backwardly so that the shoulder 67 thereof will engage and shift the control member 56 into an inoperative position.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. Clutch mechanism embodying two concentrically arranged rotatable clutch members, locking means carried by one of said members and movable into and out of engagement with the other member to lock and unlock the members with respect to each other, means tending normally to render said locking means active, a releasing member, means tending normally to position the releasing member to render said locking means inactive, a control member, a catch rendered active by the operation of said control member for engaging and moving said releasing member against the stress of its actuating means, a shiftable member, means operatively related to one of said rotatable clutch members for actuating said shiftable member to release said catch, whereby the said releasing member will be moved by its actuating means into an active position to release said locking means, said shiftable member being also operable manually at will, independently of the said rotatable clutch member.

2. Clutch mechanism embodying two concentrically arranged clutch elements, one of said elements being provided with recesses, pawls mounted upon the other element for movement therewith and with respect thereto, means tending normally to move said pawls into position to engage said recesses to lock said elements for rotation in unison in one direction and against retrograde movement, the said means embodying a projection, a control member adapted to be positioned to engage said projection to move said pawls into inoperative positions, whereby said clutch elements will be unlocked with respect to each other, means tending normally to render said control member active, an actuator, a catch device responsive in its operation to the actuation of said actuator for moving said control member against the stress of the second said means, to render said pawls active, and means operating automatically in response to the rotation of one of said clutch elements, to render said catch device inoperative, independently of the said actuator, to release the said control device, whereby said control device will be moved into active position by the second recited means.

3. Clutch mechanism embodying two concentrically arranged clutch elements, one of said elements being provided with one or more recesses, a plurality of pawls mounted upon the other element for movement therewith and with respect thereto, means tending normally to move said pawls into position to engage in a recess, one of said pawls serving to lock said elements for rotation in unison in one direction, the other pawl serving to lock the clutch elements against retrograde movement, a projection operatively related to one of the pawls, a control member adapted to be positioned to engage said projection to move the last said pawl into an inoperative position, means responsive to the operation of the last said pawl to move the other pawl into inoperative position, whereby said clutch elements will be unlocked with respect to each other, means tending normally to render said control member active, an actuator, a catch device responsive in its operation to the actuation of said actuator for moving said control member against the stress of the second said means, to render said pawls active, and means operating automatically to render said catch device inoperative, independently of the said actuator, to release the said control device, whereby said control device will be moved into active position by the second recited means.

4. A clutch embodying two concentrically arranged rotatable members, pawls carried by one member and movable into and out of engagement with a portion of the other member to lock and unlock the members with respect to each other, means tending normally to render said pawls active, interengaging means between the pawls whereby the operation of one of the pawls for moving them into inactive position will move the other into inactive position against the stress of the last said means, a control member operable upon one of the pawls, means tending normally to position the control member to actuate the last said pawl to render the pawls inactive, means operable at will to render the said control means inactive against the stress of its said positioning means, and additional means responsive to the operation of one of the clutch members to render the last said means inactive.

5. A clutch embodying two concentrically arranged rotatable members, pawls carried by one member and movable into and out of engagement with a portion of the other member to lock and unlock the members with respect to each other, means tending normally to render said pawls active, means common to the pawls for moving them into inactive position against the stress of the last said means, a control member, means tending normally to position the control member to actuate the second recited means to render the pawls inactive, means operable at will to render the said control means inactive against the stress of its said positioning means, the said means which is operable at will, embodying a catch for interlocking the control member therewith, and means operating automatically to render said catch inactive.

6. A clutch embodying two concentrically arranged rotatable members, pawls carried by one member and movable into and out of engagement with a portion of the other member to lock and unlock the members with respect to each other, means tending normally to render said pawls active, means common to the pawls for moving them into inactive position against the stress of the last said means, a control member, means tending normally to position the control member to actuate the second recited means to render the pawls inactive, means operable at will to render the said control means inactive against the stress of its said positioning means, the said means which is operable at will, embodying a catch for interlocking the control member therewith, and means operatively related to one of said clutch members for rendering said catch inactive.

7. A clutch embodying two concentrically arranged rotatable members, pawls carried by one member and movable into and out of engagement with a portion of the other member to lock and unlock the members with respect to each other, means tending normally to render said pawls active, means common to the pawls for moving them into inactive position against the stress of the last said means, a control member, means tending normally to position the control member to actuate the second recited means to render the pawls inactive, means operable at will to render the said control means inactive against the stress of its said positioning means, the said means which is operable at will, embodying a catch for interlocking the control member therewith, a shiftable member, and a cam carried by one of the clutch members for engaging and moving said shiftable member to cause the latter to release said catch.

8. A clutch embodying two concentrically arranged rotatable clutch members, pawls carried by one of said members and movable into and out of engagement with a portion of the other member for locking and unlocking said members with respect to each other, said pawls engaging the said other member in opposition to each other, means tending normally to render said pawls active, arms individual to the pawls and interengaging each other, an actuator member, means tending normally to position said actuator member to rock one of said arms to render both of said pawls inactive, a control member, means for actuating the control member for shifting the actuator member against the stress of the means which normally renders it active, and embodying a catch, and means operated upon by one of said clutch members for rendering said catch inactive to release the said control member.

9. A clutch embodying two concentrically arranged rotatable clutch members, pawls carried by one of said members and movable into and out of engagement with a portion of the other member for locking and unlocking said members with respect to each other, said pawls engaging the said other member in opposition to each other, means tending normally to render said pawls active, arms individual to the pawls and interengaging each other, an actuator member, means tending normally to position said actuator member to rock one of said arms to render both of said pawls inactive, a control member, means for actuating the control member for shifting the actuator member against the stress of the means which normally renders it active, and embodying a catch, and means for automatically shifting said catch to release the said control member, said catch shifting means being responsive to the rotation of one of said clutch members.

10. A clutch embodying two concentrically arranged rotatable clutch members, pawls carried by one of said members and movable into and out of engagement with a portion of the other member for locking and unlocking said members with respect to each other, said pawls engaging the said other member in opposition to each other, means tending normally to render said pawls active, arms individual to the pawls and interengaging each other, an actuator member, means tending normally to position said actuator member to rock one of said arms to render both of said pawls inactive, a control member, means for actuating the control member for shifting the actuator member against the stress of the means which normally renders it active, and embodying a catch, and a cam device operatively related to one of said clutch members for shifting said catch to release the said control member.

11. A clutch embodying two concentrically arranged rotatable clutch members, pawls carried by one of said members and movable into and out of engagement with a portion of the other member for locking and unlocking said members with respect to each other, said pawls engaging the said other member in opposition to each other, means tending normally to render said pawls active, arms individual to the pawls and interengaging each other, an actuator member, means tending normally to position said actuator member to rock one of said arms to render both of said pawls inactive, a control member, means for actuating the control member for shifting the actuator member against the stress of the means which normally renders it active, and embodying a catch, a swinging member, and means operatively related to one of the clutch members for engaging said swinging member for moving it into engagement with the said catch to shift the latter to release the said control member.

12. A clutch embodying two concentrically arranged rotatable elements, pawls carried by one of the elements and movable into and out of engagement with a portion of the other of said elements, to lock and unlock the elements, means whereby the operation of one of the pawls will simultaneously actuate the other pawl, a member adapted to be positioned to actuate one of the pawls, means tending normally to so position such member, means embodying a catch for retracting said member against the stress of the last said means and to hold the said member so retracted and in an inoperative position, and an additional member independent of the last said member and the said means and automatically actuated by one of said clutch members for rendering the said catch inactive, whereby the first said member may assume its normal position.

13. A clutch embodying two concentrically arranged rotatable elements, pawls carried by one of the elements and movable into and out of engagement with a portion of the other of said elements, to lock and unlock the elements, means whereby the operation of one of the pawls will simultaneously actuate the other pawl, a member adapted to be positioned to actuate one of the pawls, means tending normally to so position such member, means embodying a catch for retracting said member against the stress of the last said means and to hold the said member so retracted and in an inoperative position, and an additional member independent of the last said member and the said means and automatically actuated by one of said clutch members for rendering the said catch inactive, whereby the first said member may assume its normal position, the said additional member being freely and manually shiftable at will, independently of its automatically operating means.

14. A clutch embodying two concentrically arranged rotatable elements, pawls carried by one of the elements and movable into and out of engagement with a portion of the other of said elements, to lock and unlock the elements, means whereby the operation of one of the pawls will simultaneously actuate the other pawl, a member adapted to be positioned to actuate one of the pawls, means tending normally to so position such member, means embodying a catch for retracting said member against the stress of the last said means and to hold the said member so retracted and in an inoperative position, and an additional member independent of the last said member and the said means and automatically actuated by one of said clutch members for rendering the said catch inactive, whereby the first said member may assume its normal position, the said additional member being mounted for pivotal movement in a plane transverse to the plane of movement of the first said member.

15. A clutch embodying two concentrically arranged rotatable elements, pawls carried by one of the elements and movable into and out of engagement with a portion of the other of said elements, to lock and unlock the elements, means whereby the operation of one of the pawls will simultaneously actuate the other pawl, a member adapted to be positioned to actuate one of the pawls, means tending normally to so position such member, means embodying a catch for retracting said member against the stress of the last said means and to hold the said member so retracted and in an inoperative position, and an additional member independent of the last said member and the said means and automatically actuated by one of said clutch members for rendering the said catch inactive, whereby the first said member may assume its normal position, the said catch being mounted for movements in two planes, one of which is transverse to the other.

16. A clutch embodying two concentrically arranged rotatable elements, pawls carried by one of the elements and movable into engagement with a portion of the other element to lock and unlock the elements with respect to each other, means tending normally to render the pawls active, means for moving the pawls into an inactive position against the stress of the last said means, a member adapted to be positioned to release the pawls, means tending normally to so position said member, means embodying a catch for retracting said member and for maintaining it retracted and in an inoperative position, means tending normally to move and hold said catch in one plane, and an additional member independent of the last said member and automatically actuated by one of the said elements for moving the catch in another plane to release the first said member, whereby the latter will assume its normal position.

17. A clutch embodying two concentrically arranged rotatable elements, pawls carried by one of the elements and movable into engagement with a portion of the other element to lock and unlock the elements with respect to each other, means tending normally to render the pawls active, means for moving the pawls into an inactive position against the stress of the last said means, a member adapted to be positioned to release the pawls, means tending normally to so position said member, means embodying a catch for retracting said member and for maintaining it retracted and in an inoperative position, means tending normally to move and hold said catch in one plane, and an additional member independent of the last said member and automatically actuated by one of the said elements for moving the catch in another plane to release the first said member, whereby the latter will assume its normal position, the said additional member being mounted for free swinging movement and adapted for independent manual adjustment at will.

EINAR K. JOHANSEN.
RUDOLPH W. GLASNER.